(No Model.)
W. W. STEVENS.
STOCK RACK.
No. 579,612.
2 Sheets—Sheet 1.
Patented Mar. 30, 1897.
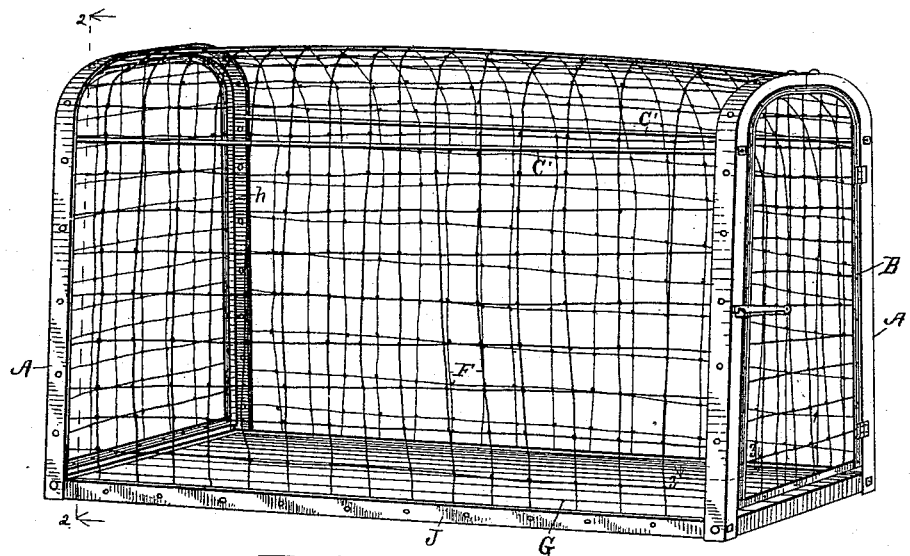
Fig. 1
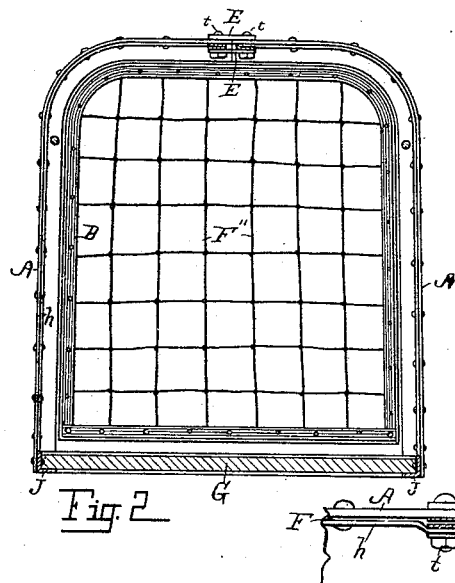
Fig. 2
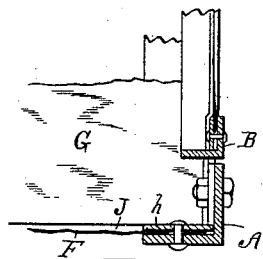
Fig. 3
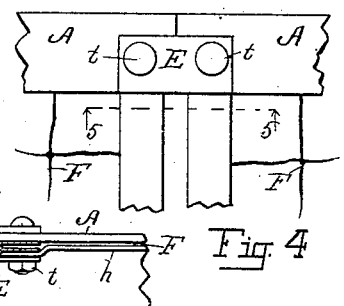
Fig. 4
Fig. 5
Witnesses:
Walter S. Wood
Marian Longyear
Inventor,
W. Kurt Stevens
By Fred L. Chappell
Att'y.

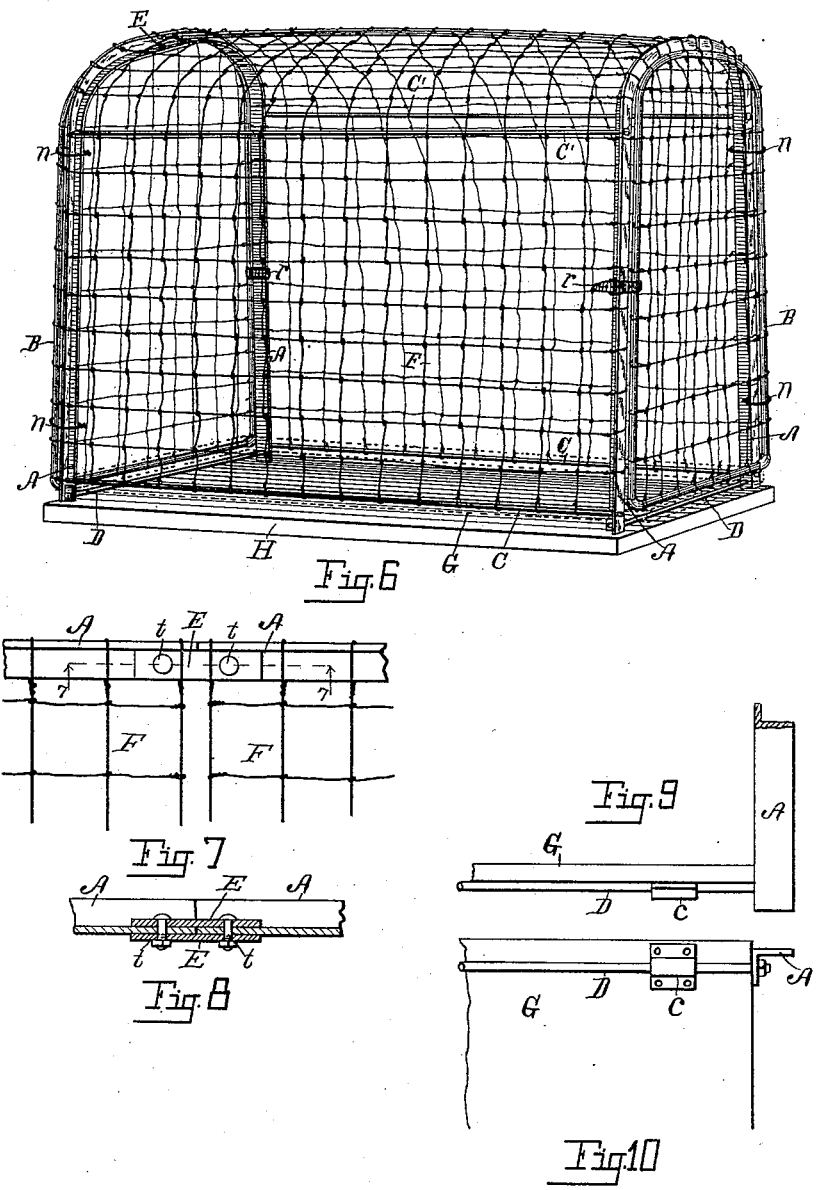

UNITED STATES PATENT OFFICE.

W. WIRT STEVENS, OF NILES, MICHIGAN.

STOCK-RACK.

SPECIFICATION forming part of Letters Patent No. 579,612, dated March 30, 1897.

Application filed March 1, 1895. Serial No. 540,137. (No model.)

*To all whom it may concern:*

Be it known that I, WILLIAM WIRT STEVENS, a citizen of the United States, residing at the city of Niles, in the county of Berrien and State of Michigan, have invented a certain new and useful Stock-Rack, of which the following is a specification.

My invention relates to improvements in stock-racks, and more particularly to a stock-rack adapted for use on a butcher's wagon or for purposes of shipping live stock, and is made principally of metal.

The rack will be found of great utility for a large variety of purposes.

The objects of my invention are, first, to provide a rack which shall be very light and at the same time of sufficient strength to answer the purpose; second, to provide such a rack that can be quickly and easily taken apart and packed away in a small space, which makes it particularly well adapted for use as a shipping-crate for live stock, making it possible to return the crate to the shipper at a very light expense; third, to provide a stock-rack which shall be very open to secure all the benefits of a free circulation of air, which is very desirable in shipping stock in warm weather; fourth, to provide a stock-rack which will not materially obstruct the view and prevent an easy examination of any live stock that may be contained therein; fifth, to cheapen the construction of such devices as much as possible; sixth, to provide a stock-rack that is specially well adapted for various uses, such as for use upon a wagon, for use as a shipping-crate, for use upon a regular butcher's wagon, or for the purpose of confining stock anywhere when it may be desired to do so. I accomplish these objects of my invention by the devices shown in the accompanying drawings, in which—

Figure 1 represents a perspective view of a stock-rack embodying the features of my invention. Fig. 2 is a sectional view on line 2 2 of Fig. 1. Fig. 3 is an enlarged detail sectional view on line 3 3 of Fig. 1, looking down in the direction of the little arrows at the end of the section-lines. Fig. 4 is an enlarged detail view of the upper end portion of the rack, looking down. Fig. 5 is a sectional view on line 5 5 of Fig. 4. Fig. 6 is a perspective view of a modification of my invention. Fig. 7 is an enlarged detail view of the upper end portion of the rack shown in Fig. 6. Fig. 8 is a sectional view on line 7 7 of Fig. 7. Fig. 9 is an enlarged detail view of one of the lower corners of the rack shown in Fig. 6, and Fig. 10 is an inverted plan view of the detail shown in Fig. 9.

Similar letters of reference refer to similar parts throughout the several views.

Referring to the lettered parts of the drawings, A A A A represent the corner-pieces of the frame. At each end the bars curve toward and are joined by the clip E at the center of the top of each end by the bolts $t\,t$ therethrough. (See Figs. 2 and 8.) These corner-pieces here shown are constructed of angle-steel, which gives strength and affords a flange for attachment in both directions. On the sides of the rack and connecting the lower ends of the corner-pieces A are angle-irons J. Toward the top of each side the frame-pieces A are connected by rods C at about the point where the top of the frame-pieces A begin to curve. Across each end extends a rod or bar D, which connects the bottom edge of the corner-pieces A A together. It will be seen that this construction affords a strong metal framework to receive a wire meshing F. This wire meshing is placed on each side of the crate separately, the strands forming the edges at the center of the top parallel to each other, or the edge may be formed of the binding-strips F' F', (see Figs. 4 and 5,) which appear clearly in Fig. 2. The wire is thus woven over the top and over each side only. The best and most satisfactory means of fastening the screen to the frame is by riveting or clamping the edges of it between metallic strips and the angle-iron, as shown in the preferred construction. Other means can be employed, as shown in the modification, which are more or less objectionable. At each end is a door constructed of angle-iron or steel bent to the appropriate form and covered with a wire meshing F'', the same as the sides. These doors are supported in place by hinges or the wire loops $n$ on one side, which allows them to open and close as though they were on hinges. The opposite side is fastened to the frame by any suitable means, as a strap $r$ or latch or clasp.

Where the rack is used for shipping purposes, the bottom is supported on the flanges formed by limbs of the angle-iron bottom pieces projecting inwardly.

For use in a wagon-box the construction just described is complete, and it will be placed in a wagon-box, depending on the sides of the box to secure the same in place, the frame of course being constructed of a size sufficiently large to permit of its being closely crowded down between the sides of the wagon-box. The plank H, Fig. 6, represents the bottom of the wagon-box.

Where the rack, as shown in Fig. 6, is to be used for shipping purposes, the floor is supported on the crate by placing the board G (see dotted lines, Fig. 6) inside the same above the rods D and supporting the same on the rods, the rods being capable of withdrawal and insertion the same as the rod to the end-gate of a wagon. Suitable clasps $c$ for rods D are placed on the board to engage the same to prevent any endwise movement of the floor G. The position of the floor G is indicated by dotted lines in Fig. 6, and the construction and means of securing the same are shown in detail in full lines in Figs. 9 and 10.

I desire to state that my improved metal stock-rack can be greatly varied in its details without departing from my invention. The particular form of the meshing of the frame is immaterial, and it can be made of light strips of metal instead of being formed of wire, though wire is much to be preferred on account of its great strength and smoothness. The frame constructed as I have indicated can be made of other forms of iron than angle-iron and rods and answer the same purpose. It will not be necessary for some uses to make the crates so that they can be quickly taken apart to be shipped in the knockdown and consequently for such uses it will be preferred to make each end all in one piece, which will be readily understood. It is not necessary for some of the uses, as for confining live stock, for this rack to be provided with a bottom or floor at all, for it can be set directly upon the ground. In very warm weather, when my improved stock-rack is exposed to the sun, or in stormy weather a canvas can be spread over the top of the same and form a shade or shelter for protection to the stock contained inside, which certainly makes the rack the most convenient of all. In use a number of these crates can be placed end to end in a large wagon and the intermediate doors removed and so make a very large stock-rack for the use of farmers for hauling large loads to market. Numerous other uses will readily suggest themselves to the owners of this improved stock-rack, and numerous variations in the construction will readily suggest themselves to those skilled in the art to which this pertains.

Having thus described my invention, what I claim, and desire to secure by Letters Patent, is—

1. In a stock-rack, the combination of a frame composed of the corner-pieces, A, curved toward each other at each end; a clip, E, and bolts, $t, t$, uniting the upper ends of said corner-pieces; angle-bars J at each side connecting the lower ends of the corner-pieces, A; and rods, C', C', toward the upper portion of each side connecting the corner-pieces, A, A, toward their upper ends; and rods or bars, D, D, across the lower end of said rack connecting the corner-pieces, A; a suitable meshing, F, over the halves of the frame separated from each other at the upper edges; a door-frame, B, formed to fit the ends of the rack; a wire meshing, F'', over said door; suitable hinges supporting each door; a fastening, $r$ for securing said door, all substantially as described for the purpose specified.

2. In a stock-rack, the combination of a frame composed of angle-iron corner-pieces, A, curved toward each other at each end; a clip, E, and bolts $t, t$, uniting the ends of said corner-pieces; bars J, at each side connecting the lower ends of the said corner-pieces, A; the rods, C', C', toward the upper portion at each side of said rack connecting the corner-pieces, A, A, toward their upper ends; rods or bars D, D, across the end of said rack connecting the lower ends of the corner-pieces, A; a suitable bottom G, supported in said rack; a door-frame, B, formed to fit the ends of the rack with suitable means of attaching the same; a wire meshing over each door and over each half of the frame so that the rack can be taken apart and packed in a small space, all substantially as described for the purpose specified.

3. In a stock-rack, the combination of a frame composed of angle-iron corner-pieces, A, curved over the ends; angled side bars J, at each side connecting the lower ends of said corner-pieces; and rods C', C', toward the upper part of each side of said frame connecting the corner-pieces at that point; rods or bars, D, D, across the ends of said rack connecting the lower ends of the corner-pieces, A; a suitable bottom, G, supported on the flanges formed by said angle-irons $a$ meshing over said frame; and suitable doors at each end, for the purpose specified.

In witness whereof I have hereunto set my hand and seal in the presence of two witnesses.

W. WIRT STEVENS. [L. S.]

Witnesses:
CHAS. JOHNSON,
GEO. J. HOWARD.